United States Patent
Shimamura et al.

(10) Patent No.: US 11,313,663 B2
(45) Date of Patent: Apr. 26, 2022

(54) LOCATION ESTIMATION APPARATUS, MOVING OBJECT, LOCATION ESTIMATION METHOD, AND COMPUTER-READABLE STORAGE MEDIUM

(71) Applicant: HONDA MOTOR CO., LTD., Tokyo (JP)

(72) Inventors: Hideaki Shimamura, Saitama (JP); Keiji Muro, Saitama (JP); Naoki Kameyama, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 91 days.

(21) Appl. No.: 16/986,296

(22) Filed: Aug. 6, 2020

(65) Prior Publication Data
US 2020/0363183 A1 Nov. 19, 2020

Related U.S. Application Data

(63) Continuation of application No. PCT/JP2018/007651, filed on Feb. 28, 2018.

(51) Int. Cl.
*G01B 7/004* (2006.01)
*G01C 21/00* (2006.01)
*G01C 9/02* (2006.01)

(52) U.S. Cl.
CPC ............ *G01B 7/004* (2013.01); *G01C 9/02* (2013.01); *G01C 21/3833* (2020.08)

(58) Field of Classification Search
None
See application file for complete search history.

(56) References Cited

U.S. PATENT DOCUMENTS

| | | | | |
|---|---|---|---|---|
| 6,272,405 B1 * | 8/2001 | Kubota | ............... | G01C 21/12 342/357.31 |
| 8,781,739 B1 * | 7/2014 | Miller | ............... | G01S 5/16 701/518 |

(Continued)

FOREIGN PATENT DOCUMENTS

| JP | 2009289145 A | 12/2009 |
|---|---|---|
| JP | 2011129049 A | 6/2011 |

(Continued)

OTHER PUBLICATIONS

International Preliminary Report on Patentability for International Application No. PCT/JP2018/007651, issued by the International Bureau of WIPO dated Sep. 1, 2020.

*Primary Examiner* — Jonathan M Dager
*Assistant Examiner* — Garrett F Evans

(57) ABSTRACT

It includes an intensity pattern determination section to determine an intensity pattern indicating a distribution of a magnitude of a target quantity in at least a part of a moving path of the moving object, a subarea determination section to determine, among a plurality of subareas, one or more subareas having an intensity pattern which matches or is similar to an intensity pattern determined by the intensity pattern determination section based on map information which associates area identification information which identifies each of a plurality of subareas included in a target region having a predetermined geographic range and an intensity parameter indicating a magnitude of a target quantity premeasured in the subarea, and an output section to output, as a location of the moving object, one or more subareas determined by the subarea determination section.

11 Claims, 7 Drawing Sheets

(56) References Cited

U.S. PATENT DOCUMENTS

| | | | |
|---|---|---|---|
| 2016/0216304 A1* | 7/2016 | Sekelsky | B60L 53/32 |
| 2016/0278287 A1 | 9/2016 | Kasai | |
| 2016/0377688 A1* | 12/2016 | Kleiner | B25J 9/1694 |
| | | | 324/202 |
| 2019/0063930 A1 | 2/2019 | Watanabe | |
| 2020/0320870 A1 | 10/2020 | Yamamoto | |

FOREIGN PATENT DOCUMENTS

| | | | |
|---|---|---|---|
| JP | 2013223531 | A | 10/2013 |
| JP | 2014016281 | A | 1/2014 |
| JP | 2016185099 | A | 10/2016 |
| JP | 6250240 | B1 | 12/2017 |
| WO | 2017209112 | A1 | 12/2017 |

\* cited by examiner

LOCATION ESTIMATION APPARATUS, MOVING OBJECT, LOCATION ESTIMATION METHOD, AND COMPUTER-READABLE STORAGE MEDIUM

The contents of the following international application are incorporated herein by reference:
NO. PCT/JP2018/007651 filed on Feb. 28, 2018.

BACKGROUND

1. Technical Field

The present invention relates to a location estimation apparatus, a moving object, a location estimation method, and a computer-readable storage medium.

2. Related Art

In recent years, a work machine which autonomously travels inside a predetermined region has been developed using a positioning technology which utilizes a GPS signal (for example, see Patent document 1 or 2).

PRIOR ART DOCUMENT

Patent Document

[Patent document 1] Japanese Unexamined Patent Application, Publication No. 2016-185099
[Patent document 2] Japanese Unexamined Patent Application, Publication No. 2013-223531

The summary clause does not necessarily describe all necessary features of the embodiments of the present invention. The present invention may also be a sub-combination of the features described above. BRIEF DESCRIPTION OF THE

DRAWINGS

Figure 1:
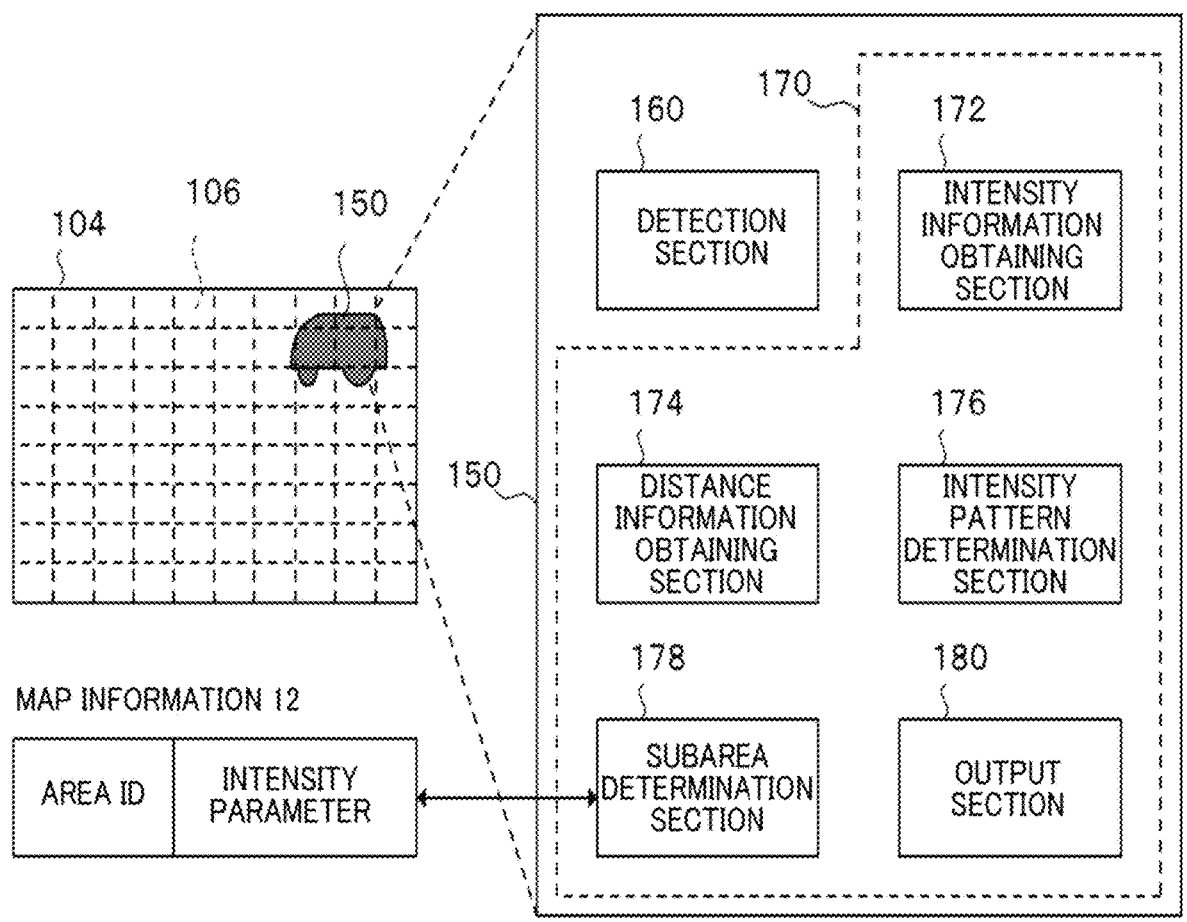
Figure 2:
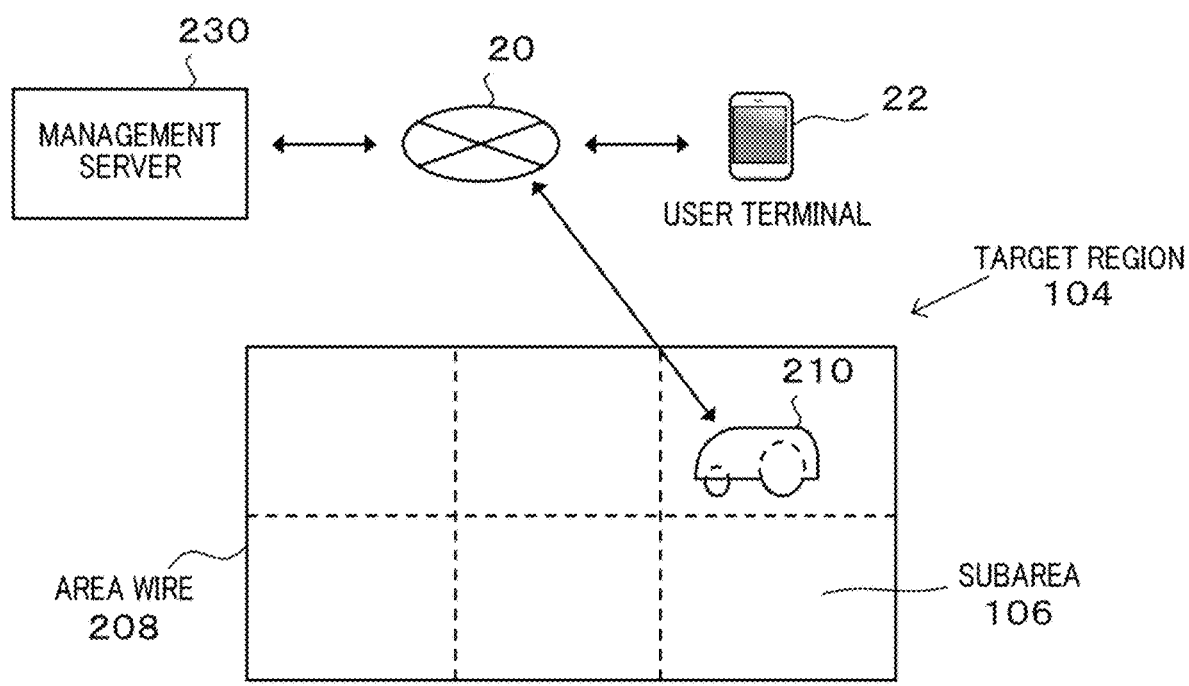
Figure 3:
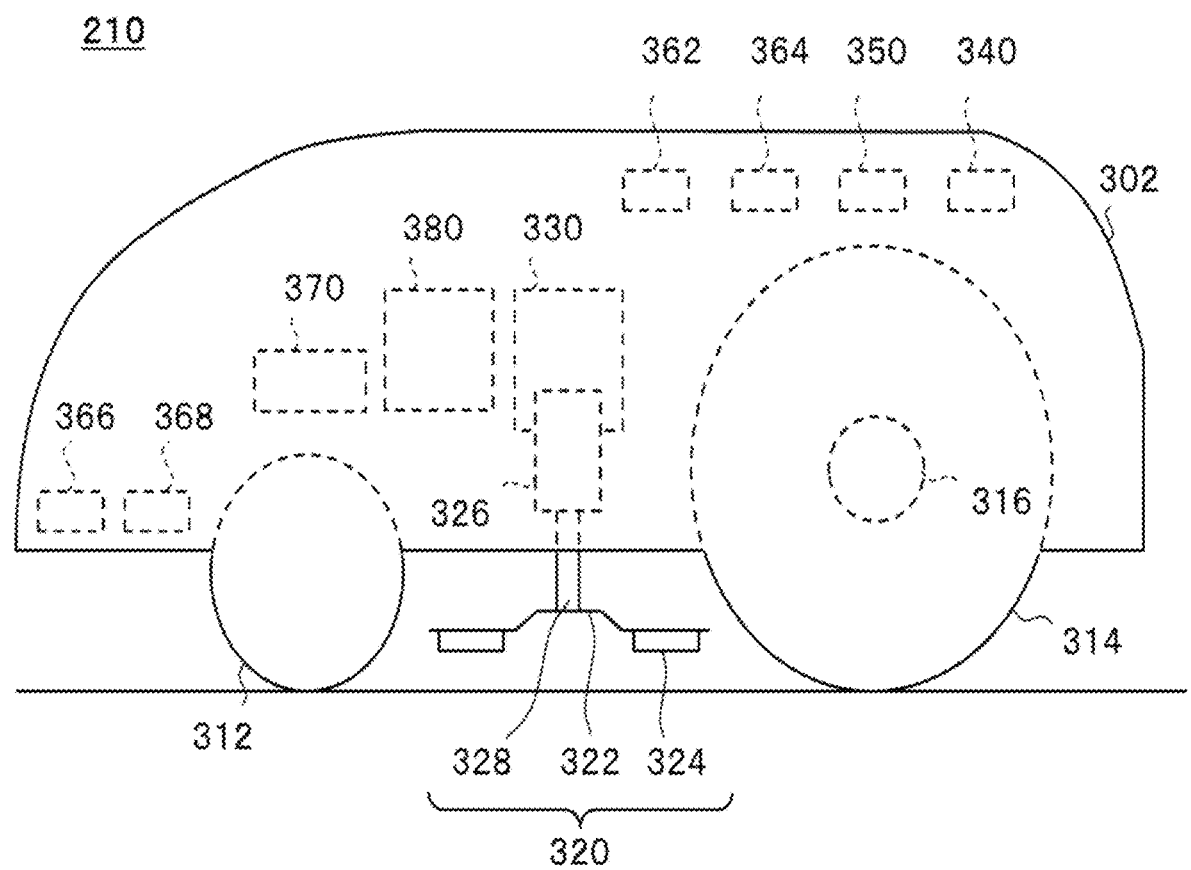
Figure 4:
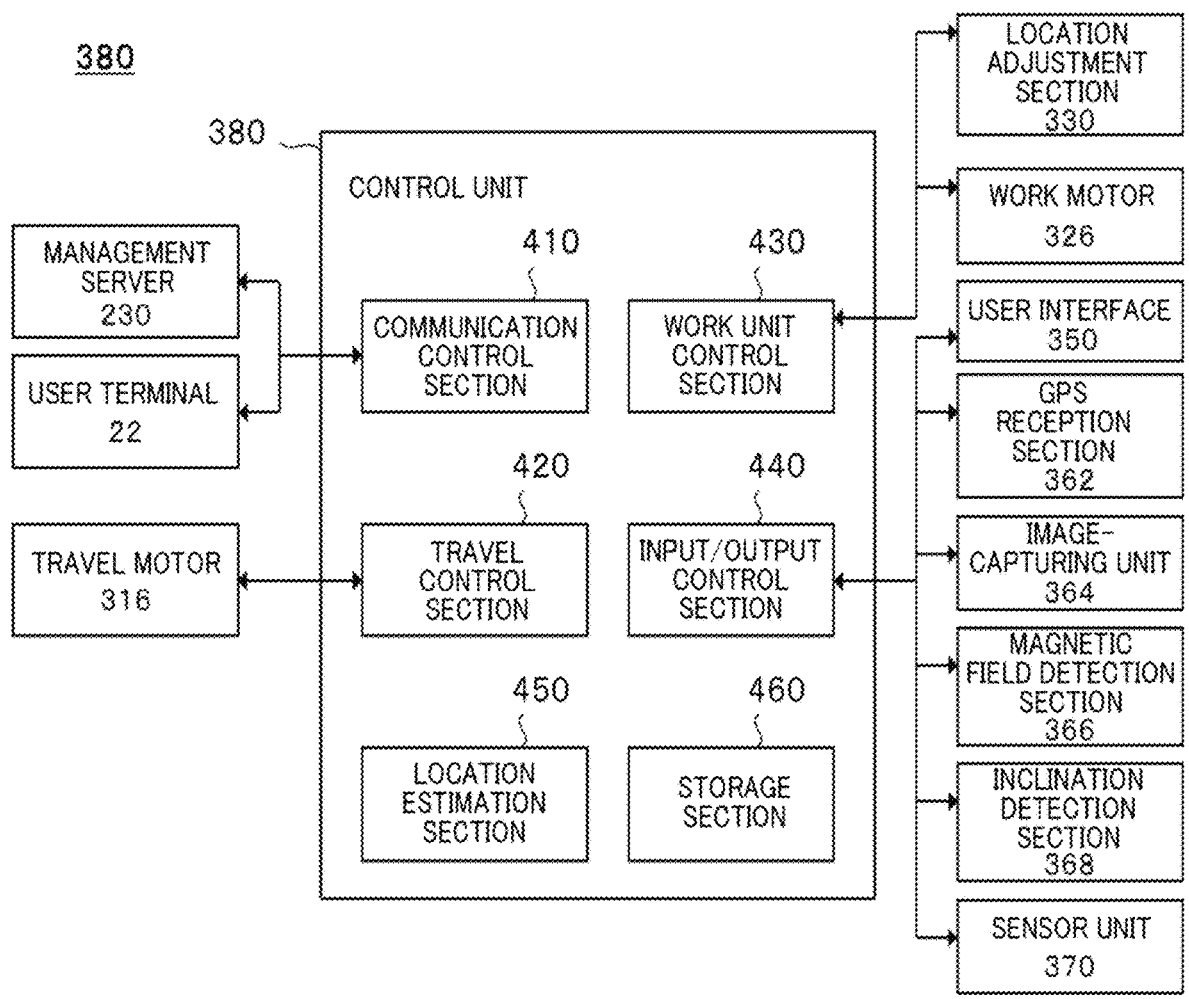
Figure 5:
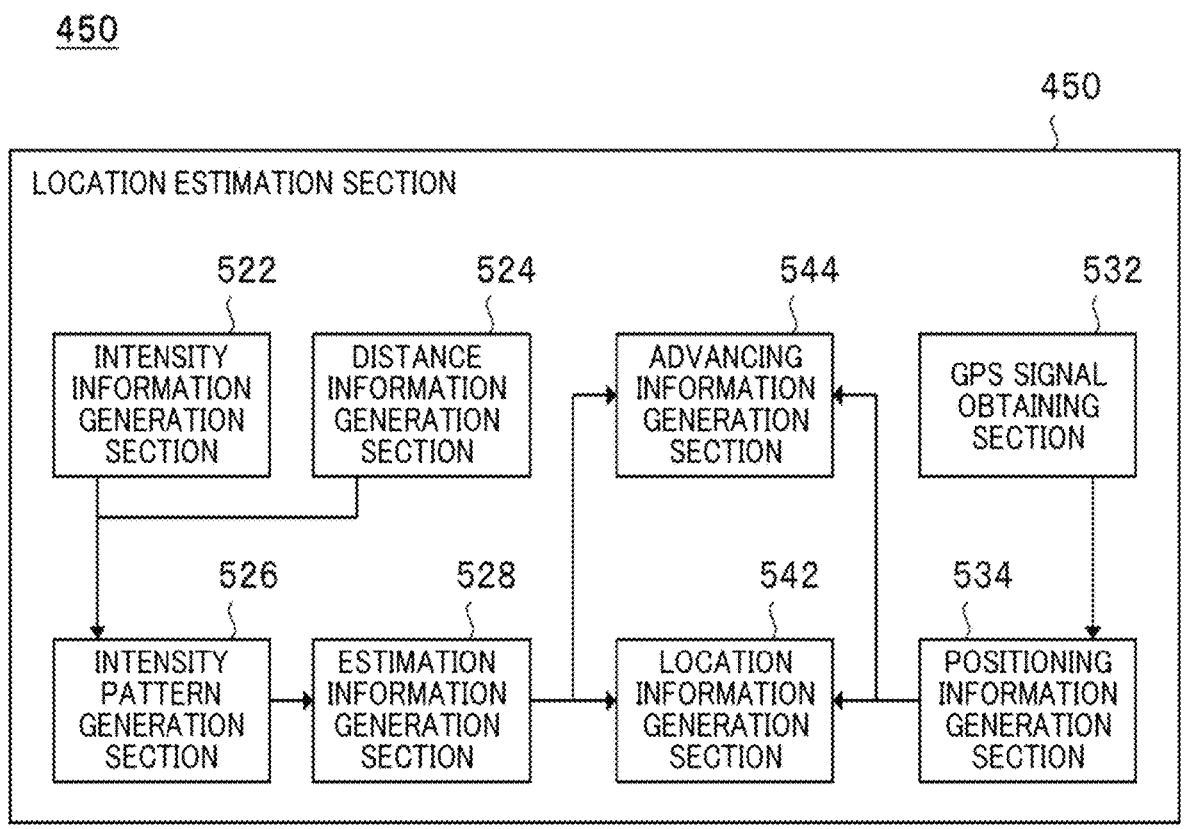
Figure 6:
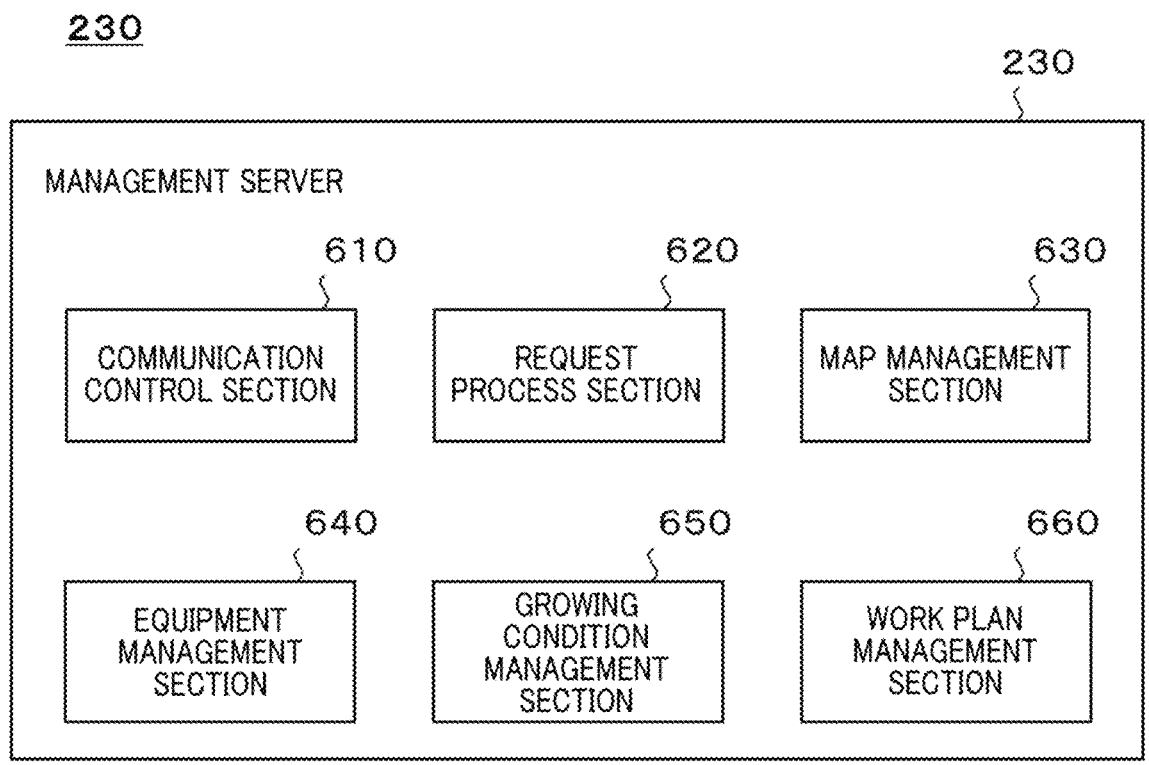
Figure 7:
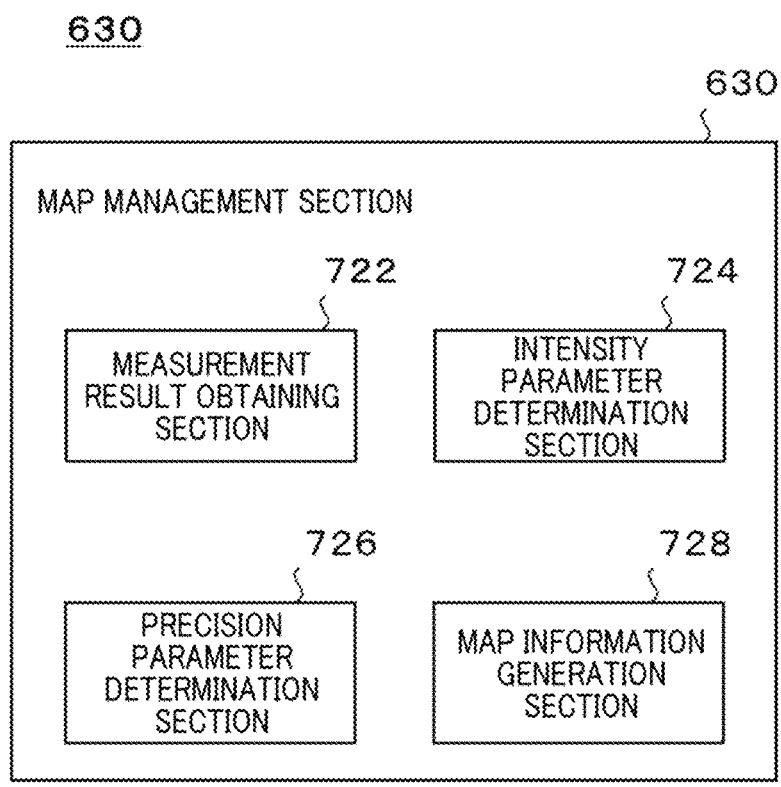

FIG. 1 schematically shows one example of the internal configuration of the moving object 150.
FIG. 2 schematically shows one example of the system configuration of the management system 200.
FIG. 3 schematically shows one example of the internal configuration of the lawn mower 210.
FIG. 4 schematically shows one example of the internal configuration of the control unit 380.
FIG. 5 schematically shows one example of the internal configuration of the location estimation section 450.
FIG. 6 schematically shows one example of the internal configuration of the management server 230.
FIG. 7 schematically shows one example of the internal configuration of the map management section 630.

DESCRIPTION OF EXEMPLARY EMBODIMENTS

Hereinbelow, the present invention will be described through embodiments of the invention, but the following embodiments do not limit the invention disclosed in claims. In addition, not all combinations of features described in the embodiments are necessarily essential to the solution of the invention. Note that in the drawings, the same reference numbers may be applied to the same or similar portions and the redundant descriptions may be omitted in some cases. In addition, two or more elements which each has the same name and has different reference numbers may have the configuration similar to each other as long as there is no technically serious contradiction.

[Outline of the Moving Object 150]

FIG. 1 schematically shows one example of the internal configuration of the moving object 150. In the present embodiment, the moving object 150 includes, for example, the detection section 160. The moving object 150 includes, for example, the location estimation apparatus 170. In the present embodiment, the location estimation apparatus 170 includes, for example, the intensity information obtaining section 172. The location estimation apparatus 170 includes, for example, the distance information obtaining section 174. The location estimation apparatus 170 includes, for example, the intensity pattern determination section 176. The location estimation apparatus 170 includes, for example, the subarea determination section 178. The location estimation apparatus 170 includes, for example, the output section 180.

In the present embodiment, the moving object 150 includes an autonomous movement function. For example, the moving object 150 autonomously moves inside the target region 104. In the present embodiment, a location of the moving object 150 is determined based on output data from the detection section 160 mounted to the moving object 150. It is noted that, in the present specification, the information output by any component may be referred to as output data in some cases. The moving object 150 may autonomously moves inside the target region 104 by utilizing location information of the moving object 150 determined based on the output data from the detection section 160. The moving object 150 may be a moving object which travels on the ground, may be a moving object flying in the air, or a moving object navigating under water or on water.

In the present embodiment, the target region 104 has a predetermined geographic range. The location and range of the target region 104 is not specifically limited. The shape and size of a particular region is referred to as the range of a particular region in some cases. A plurality of subareas 106 is included inside the target region 104. The subarea 106 may include a region which is separated by a physical geographical boundary or may be a region which is separated by a virtual geographical boundary.

Examples of a physical geographical boundary may include (i) a boundary defined by a structural body which is naturally or artificially formed, (ii) a boundary defined by sprayed chemical substance, (iii) a boundary defined by electromagnetic wave such as visible ray, infrared ray, and ultraviolet ray, (iv) a boundary defined by magnetic field, and (v) a boundary defined by acoustic wave or ultrasonic sound wave, and the like. Examples of a structural body formed naturally may include a dip, a step, a slope, lake and reservoir, river, and the like. Examples of a structural body formed artificially may include a passage, a groove, a tunnel, a building, a wire, a rope, a fence, a net, a Braille block, and the like. Examples of the virtual geographical boundary include a geofence, a virtual wire, and the like. The virtual wire may be a geographical boundary defined by a virtual line which is set among a plurality of structural bodies.

The quantity of the subareas 106 included inside the target region 104 and the size and shape of the subarea 106 are not specifically limited. However, it is preferable that a plurality of subareas 106 is uniformly arranged inside the target region 104 to avoid the absence of arrangement and the overlap of arrangement. The plurality of subareas 106 may each have the same size or different size. The plurality of subareas 106 may each have the same shape or different shape.

The quantity of the subareas 106 arranged inside the target region 104 may be fixed or may be variable. For example, in response to the occurrence of a predetermined event, the quantity of the subareas 106 arranged in a particular region which constitutes a part of the target region 104 is changed. Specifically, a plurality of the subareas 106 which is arranged adjacent to each other may be virtually combined to form a single subarea 106. The single subarea 106 may be virtually divided into a plurality of the subareas 106 which is arranged adjacent to each other. The quantity of the subareas 106 arranged in a particular region inside the target region 104 may be adjusted according to a required precision.

[Outline of Each Section of the Moving Object 150]

In the present embodiment, the detection section 160 detects the state or change of a measurement target and outputs information (also referred to as intensity information in some cases) indicating the magnitude of a feature quantity of the measurement target (also referred to as target quantity in some cases). More specifically, the detection section 160 is mounted to the moving object 150 and measures the magnitude of a target quantity in the vicinity of the moving object 150. The moving object 150 outputs, to the location estimation apparatus 170, the information indicating the magnitude of the measured target quantity.

The above-described target quantity may be a physical quantity or may be a chemical quantity. The physical quantity may be a feature quantity indicating a physical phenomenon. The chemical quantity may be a feature quantity indicating the substance component, the composition ratio, the concentration, and the like of a measurement target. The above-described target quantity may be a mechanical, thermal, electromagnetic, acoustic, or chemical feature quantity.

In one embodiment, the output data from the detection section 160 includes the information indicating the magnitude of the target quantity. The output data from the detection section 160 may include the information indicating a measurement interval of the detection section 160. In another embodiment, the output data from the detection section 160 includes the information which associates the information indicating a time and the information indicating the magnitude of a target quantity at the time. In still another embodiment, the output data from the detection section 160 includes the information which associates the information indicating the time, the information indicating the magnitude of the target quantity at the time, and the information indicating a measurement error or measurement precision related to the magnitude of the target quantity.

In the present embodiment, the location estimation apparatus 170 estimates the location of the moving object 150. The location estimation apparatus 170 estimates the location of the moving object 150 based on, for example, the output data from the detection section 160. More specifically, the location estimation apparatus 170 associates, for example, the output data from the detection section 160 and the output data from the wheel speed sensor or rotary encoder (not illustrated) mounted to the moving object 150 to generate the distribution pattern of the target quantity detected by the detection section 160. The location estimation apparatus 170 determines the location of the moving object 150 based on, for example, the above-described distribution pattern and the information indicating the geographic distribution of the above-described target quantity inside and in the vicinity of the target region 104 (also referred to as map information in some cases).

In the present embodiment, the intensity information obtaining section 172 obtains the intensity information indicating the magnitude of the target quantity detected by the detection section 160. For example, the intensity information obtaining section 172 obtains the output data from the detection section 160. In one embodiment, the intensity information obtaining section 172 outputs, to the intensity pattern determination section 176, the output data from the detection section 160. In another embodiment, the intensity information obtaining section 172 converts the output data from the detection section 160 to any format and outputs the converted data to the intensity pattern determination section 176. For example, the intensity information obtaining section 172 evaluates the output data from the detection section 160 by using a particular evaluation manner and outputs the information indicating the result of the evaluation to the intensity pattern determination section 176.

In the present embodiment, the distance information obtaining section 174 obtains the distance information indicating the distance between two spots where each of two pieces of intensity information obtained by the intensity information obtaining section 172 has been obtained. For example, the distance information obtaining section 174 calculates the above-described distance based on the output data from the wheel speed sensor or rotary encoder (not illustrated) mounted to the moving object 150. For three or more pieces of intensity information, the distance information obtaining section 174 may calculate the above-described distance for each of two pieces of intensity information which are in consecutive order in time series.

In the present embodiment, the intensity pattern determination section 176 determines the intensity pattern indicating the distribution of the magnitude of the target quantity along at least a part of the moving path of the moving object 150. The intensity pattern determination section 176 determines the intensity pattern indicating the distribution of the magnitude of the target quantity along at least a part of the moving path of the moving object 150 based on, for example, (i) a plurality of pieces of intensity information obtained by the intensity information obtaining section 172 along at least a part of the moving path of the moving object 150 and (ii) the distance information corresponding to a plurality of pieces of intensity information obtained by the distance information obtaining section 174. For example, if the location estimation apparatus 170 estimates the location of the moving object 150 in the first time, the intensity pattern determination section 176 determines the above-described intensity pattern based on a plurality of pieces of intensity information output from the detection section 160 in a period from a second time close to the first time to a third time prior to the second time and the distance information corresponding to a plurality of pieces of intensity information.

The second time may be a time prior to the first time, or may be a time after the first time. The period from the third time to the second time is not specifically limited. Thereby, the intensity pattern determination section 176 can generate an intensity pattern along the moving path along which the moving object 150 passes during a period from the third time to the second time among the moving paths along which the moving object 150 actually passes.

The intensity pattern determination section 176 may adjust the length of the moving path for which the intensity pattern is determined according to the estimation precision of the location of the moving object 150. The intensity pattern determination section 176 may adjust the length of the moving path for which the intensity pattern is determined by adjusting the period from the third time to the second time. The estimation precision of the location of the moving object 150 improves as the moving path for which the intensity pattern is determined increases.

In the present embodiment, the subarea determination section 178 determines one or more subareas 106 which are likely to have the moving object 150 therein based on the intensity pattern determined by the intensity pattern determination section 176. The subarea determination section 178 may output the information indicating the determination result to the output section 180.

For example, the subarea determination section 178 determines one or more subareas 106 having the intensity pattern which matches or is similar to the intensity pattern determined by the intensity pattern determination section 176 among a plurality of subareas 106 included in the target region 104 based on the map information 12. The map information 12 may be the information which associates the area identification information which identifies each of a plurality of subareas 106 included in the target region 104 (also referred to as area ID in some cases) and the intensity parameter indicating the magnitude of a target quantity premeasured in the subarea.

The intensity parameter related to the particular target quantity may be the parameter indicating the magnitude of the target quantity, and the format and the calculated method are not specifically limited. The intensity parameter of a particular target quantity may be calculated by evaluating the magnitude of the target quantity with any criteria or manner. The intensity parameter may be represented with consecutive numerical values or may be represented by a stepwise segmentation.

The intensity parameter may be consecutive numerical values represented with any unit system. The output data from the detection section 160 may be one example of the intensity parameter represented with consecutive numerical values. For example, the electric signal output from the detection device of the detection section 160 is converted in a detection circuit of the detection section 160, so that the measurement values represented as consecutive numerical values are output. The intensity parameter represented with a stepwise segmentation may be calculated by evaluating the output data from the detection section 160 or the intensity parameter represented with consecutive numerical values with an evaluation manner such as n-step evaluation (n is an integer equal to or more than two), an evaluation function, a learning device, and the like.

In the present embodiment, the output section 180 estimates the location of the moving object 150 based on the determination result of the subarea determination section 178. For example, the output section 180 outputs, as the location of the moving object 150, one or more subareas determined by the subarea determination section 178. The output section 180 may output, as the location of the moving object 150, a part of one or more subareas determined by the subarea determination section 178.

In the present embodiment, the detail of the location estimation apparatus 170 has been described using, as an example, the embodiment where the location estimation apparatus 170 is mounted to the moving object 150. However, the location estimation apparatus 170 is not limited to the present embodiment. In another embodiment, a part of the location estimation apparatus 170 or the location estimation apparatus 170 may be arranged outside the moving object 150. The location estimation apparatus 170 may be the information process apparatus which can transmit and receive the information with the moving object 150 via a communication network or may be realized by the information process apparatus. A part of the functions of the location estimation apparatus 170 may be realized by the above-described information process apparatus.

[Specific Configuration of Each Section of the Moving Object 150]

Each section of the moving object 150 may be realized by hardware, software, or hardware and software. If at least some of components (for example, the location estimation apparatus 170) constituting the moving object 150 are realized by software, the components realized by the software may be realized by activating, in an information process apparatus having a general configuration, a program stipulating operations about the components.

The above-described information process apparatus may include: (i) a data processing apparatus having processors such as a CPU or a GPU, a ROM, a RAM, a communication interface and the like, (ii) an input apparatus such as a keyboard, touch panel, camera, microphone, various types of sensors or GPS receiver, (iii) an output apparatus such as a display apparatus, a speaker or a vibration apparatus, and (iv) a storage apparatus (including an external storage apparatus) such as a memory or a HDD. In the above-described information process apparatus, the above-described data processing apparatus or a storage apparatus may store the above-described program. The above-described program causes the information process apparatus described above to perform the operations defined by this program, by being executed by the processor. The above-described program may be stored in a non-transitory computer readable storage medium.

The above-described program may be a program to enable a computer to function as the location estimation apparatus 170. The above-described computer may be a computer mounted on the moving object 150. The above-described computer may be a computer which provides a cloud service or may be a computer which realizes a client server system.

The above-described program may be a program to enable a computer to perform one or more procedures related to various types of information processing in the location estimation apparatus 170. The above-described program may be a program to enable a computer to perform a location estimation method.

The above-described location estimation method includes, for example, an intensity information obtaining step to obtain the intensity information indicating the magnitude of the target quantity detected by the detection section 160 mounted to the moving object 150. The above-described location estimation method includes, for example, the distance information obtaining step to obtain the distance information indicating the distance between two spots where each of two pieces of intensity information obtained in the intensity information obtaining step has been obtained. The above-described location estimation method includes an intensity pattern determination step to determine the intensity pattern indicating distribution of the magnitude of the target quantity in at least a part of the moving path of the moving object 150 based on, for example, (i) a plurality of pieces of intensity information obtained along at least a part of the moving path of the moving object 150 in the intensity information obtaining step and (ii) the distance information corresponding to a plurality of pieces of intensity information obtained in the distance information obtaining step. The above-described location estimation method includes a subarea determination step to determine one or more subareas 106 having the intensity pattern which matches or is similar to the intensity pattern determined in the intensity pattern determination step among a plurality of subareas 106 based on, for example, the map information 12 which associates the area identification information which identifies each of a plurality of subareas 106 included in the target region 104 having a predetermined geographic range and the intensity parameter indicating the magnitude of a target quantity premeasured in the subarea. For example, the above-described location estimation method includes an output step to output, to the location of the moving object 150, at least a part of one or more subareas determined in the subarea determination step.

[Outline of the Management System 200]

FIG. 2 schematically shows one example of the system configuration of the management system 200. In the present embodiment, the management system 200 includes one or more lawn mowers 210 and the management server 230. The management system 200 may include one or more user terminals 22.

The management system 200 may be one example of the location estimation apparatus. The lawn mower 210 may be one example of the moving object. The computer of the lawn mower 210 may be one example of the location estimation apparatus.

The present embodiment, the area wire 208 is buried in the vicinity of the boundary of the target region 104. When voltage is applied across both ends of the area wire 208, current flows in the area wire 208, causing magnetic field in the vicinity of the area wire 208. The lawn mower 210 can detect the boundary of the target region 104 by detecting the above-described magnetic field. In addition, the lawn mower 210 can distinguish whether the lawn mower 210 is present inside the region surrounded by the area wire 208 or is present outside the region by detecting the direction of the above-described magnetic field.

In one embodiment, the area wire 208 is arranged on the boundary of the target region 104. In another embodiment, the area wire 208 is arranged in slightly inner side relative to the boundary of the target region 104. In still another embodiment, the area wire 208 is arranged in slightly outer side relative to the boundary of the target region 104. The boundary of the target region 104 and the offset amount of the area wire 208 are not specifically limited.

In the present embodiment, to simplify the description, the detail of the management system 200 is described using, as an example, the case in which the lawn mower 210 has an autonomous movement function and the computer mounted to the lawn mower 210 estimates the location of the lawn mower 210. However, the management system 200 is not limited to the present embodiment. In another embodiment, at least one of the user terminal 22 and the management server 230 may estimate the location of the lawn mower 210 and transmit the estimation result to the lawn mower 210. In this case, at least one of the user terminal 22 and the management server 230 may be one example of the location estimation apparatus.

Each section of the management system 200 may transmit and receive information with each other. For example, the lawn mower 210 transmits and receives information with at least one of the user terminal 22 and the management server 230 via the communication network 20.

In the present embodiment, the communication network 20 may be a wired communication transmission path, a wireless communication transmission path, or a combination of a wireless communication transmission path and a wired communication transmission path. The communication network 20 may include a wireless packet communication network, the Internet, a P2P network, a private line, a VPN, an electrical power line communication line and the like. The communication network 20: (i) may include a mobile communication network such as a cellular phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, the user terminal 22 is a communication terminal utilized by a user of the management system 200 or the lawn mower 210, but the detail thereof is not specifically limited. Examples of the user terminal 22 may include a personal computer, mobile terminal and the like. Examples of the mobile terminal may include a cellular phone, a smartphone, a PDA, a tablet, a notebook computer or laptop computer, a wearable computer and the like.

In the present embodiment, the management system 200 manages the target region 104. For example, the management system 200 may manage the state of the object which is the target of the work to be performed in the target region 104 (referred to as work target in some cases). The management system 200 may manage the work to be performed in the target region 104. For example, the management system 200 manages the schedule of the work. The work schedule may be the information which defines at least one of a period when the work is performed, a place where the work is performed, an entity which performs the work, a work target, and a content of the work.

In the present embodiment, the management system 200 manages the lawn mower 210. The lawn mower 210 may be one example of an entity which performs the work. For example, the management system 200 manages a state of the lawn mower 210. For example, the management system 200 manages a location, an advancing direction, an advancing speed, a moving mode, a work mode, a remaining level of energy (for example, a remaining level of the battery) of the lawn mower 210, a schedule of work performed by the lawn mower 210, and the like.

The work mode defines at least one of, for example, (i) whether the work can be performed, and (ii) the work intensity. Examples of the work mode include (i) a mode in which a work is performed during a moving period, (ii) a mode in which a work is stopped or suspended during a moving period, (iii) a mode in which a work is performed during a straight moving period, but a work is stopped or suspended during a turning operation, and the like.

Another example of the work mode includes (i) a mode in which the work intensity is relatively large, (ii) a mode in which the work intensity is moderate, (iii) a mode in which the work intensity is relatively small, and the like. Other examples of the work mode include (iv) the mode to return to the home station, (v) the mode to move from the home station to the location where the work of interest is started, and the like. The home station may be the location where the lawn mower 210 waits or is stored. In the home station, a replenish apparatus to replenish energy or consumable to the lawn mower 210 may be arranged. The home station may be arranged inside the work region of the lawn mower 210 or may be arranged outside the work region.

Examples of the work intensity include a work frequency in a particular period, a work amount per work, a total work amount in a particular period, and the like. The work intensity may be represented with consecutive numerical values or may be represented with a stepwise segmentation. Each segment may be distinguished with symbols or characters, or may be distinguished with numbers.

[Outline of Each Section of the Management System 200]

In the present embodiment, the lawn mower 210 has an autonomous travel function. In the present embodiment, the lawn mower 210 autonomously travels inside the target region 104. It is noted that the lawn mower 210 may moves with a remote operation from the user terminal 22 or the management server 230. In the present embodiment, the lawn mower 210 performs a lawn mowing work. The lawn mower 210 may perform a work other than the lawn mowing work. In the present embodiment, the lawn mower 210 performs the lawn mowing work inside the target region 104 and cuts plants such as lawn. The plant may be one example of the work target. On the other hand, outside the target region 104 (referred to as non-work region in some cases), the lawn mower 210 stops the lawn mowing work. The lawn mower 210 will be described in detail later.

The lawn mower 210 may have a configuration similar to the moving object 150 as long as there is no technical contradiction. Similarly, the moving object 150 may have a configuration similar to that of the lawn mower 210 as long as there is no technical contradiction.

The moving object is not limited to the lawn mower 210. The moving object may be a moving object which travels on the ground, may be a moving object flying in the air, or a moving object navigating under water or on water. Other specific examples of the moving object may include a drone, a helicopter, an airship, and the like which fly in the air. The above-described moving object may have an autonomous movement function. The moving object may be a work machine which performs any works.

In the present embodiment, the management server 230 manages various types of information related to the target region 104. For example, the management server 230 manages the geological information related to the target region 104. The management server 230 may manage the information indicating the geographic distribution of parameter indicating the properties at each spot of the target region 104.

In one embodiment, the management server manages the information indicating the geographic distribution of the intensity parameter indicating a magnitude of any target quantity in the target region 104 (also referred to as map information in some cases). In another embodiment, the management server 230 manages the information indicating the location of the boundary of the target region 104. In yet another embodiment, the management server 230 manages the information which associates the information indicating the location of a particular spot or region on the boundary of the target region 104 and the information indicating the content of the operation of the lawn mower 210 in the spot or region.

The management server 230 may manage the state of equipment which configures the management system 200. The management server 230 may control an operation of the equipment which configures the management system 200. The management server 230 may manage the growing condition of the plant which is the work target. The management server 230 may manage various types of work to be performed in the target region 104. For example, the management server 230 creates a schedule of the above-described various types of work. The management server 230 may manage the progress of schedule of the above-described various types of work. The management server 230 will be described in detail later.

[Specific Configuration of Each Section in the Management System 200]

Each section of the management system 200 may be realized by the hardware, may be realized by the software, or may be realized by the hardware and software. At least a part of each section in the management system 200 may be realized by a single server, or realized by a plurality of servers. At least a part of each section in the management system 200 may be realized on a virtual server or a cloud system. At least a part of each section in the management system 200 may be realized by a personal computer or a mobile terminal. Examples of the mobile terminal may include a cellular phone, a smartphone, a PDA, a tablet, a notebook computer or a laptop computer, a wearable computer and the like. The management system 200 may store information by utilizing a distributed ledger technology or a distributed network such as a block chain.

If at least a part of components constituting the management system 200 is realized by software, the component realized by the software may be realized by activating a program which defines the operation related to the component in an information process apparatus with a general configuration. The above-described information process apparatus may include: (i) a data processing apparatus having processors such as a CPU or a GPU, a ROM, a RAM, a communication interface and the like, (ii) an input apparatus such as a keyboard, touch panel, camera, microphone, various types of sensors or GPS receiver, (iii) an output apparatus such as a display apparatus, a speaker or a vibration apparatus, and (iv) a storage apparatus (including an external storage apparatus) such as a memory or a HDD. In the above-described information process apparatus, the above-described data processing apparatus or storage apparatus may store the above-described program. The above-described program causes the information process apparatus described above to perform the operations defined by this program, by being executed by the processor. The above-described program may be stored in a non-transitory computer readable storage medium.

The above-described program may be a program which allows a computer to perform one or more procedures related to various types of information processing in the management system 200. The above-described program may be a program to enable a computer to function as a location estimation apparatus. The above-described program may be a program to enable a computer to perform a location estimation method. The above-described location estimation method may have a configuration similar to the location estimation method described with reference to FIG. 1.

[Outline of Lawn Mower 210]

The outline of the lawn mower 210 will be described using FIG. 3, FIG. 4, and FIG. 5. FIG. 3 schematically shows one example of the internal configuration of the lawn mower 210. In the present embodiment, the lawn mower 210 includes the housing 302. In the present embodiment, the lawn mower 210 includes a pair of front wheels 312 and a pair of rear wheels 314 under the housing 302. The lawn mower 210 may include a pair of travel motors 316 which respectively drive a pair of rear wheels 314.

In the present embodiment, the lawn mower 210 includes the work unit 320. The work unit 320 includes, for example, the blade disk 322, the cutter blade 324, the work motor 326, and the shaft 328. The lawn mower 210 may include the location adjustment section 330 which adjusts the location of the work unit 320.

The blade disk 322 is linked to the work motor 326 via the shaft 328. The cutter blade 324 may be a cutting blade which cuts lawn. The cutter blade 324 is attached to the blade disk 322 and rotates together with the blade disk 322. The work motor 326 rotates the blade disk 322. The blade disk 322 and the cutter blade 324 may be one example of the cutting member which cuts the work target.

In the present embodiment, the lawn mower 210 includes the battery unit 340, the user interface 350, the GPS reception section 362, the image-capturing unit 364, the magnetic field detection section 366, the inclination detection section 368, the sensor unit 370, and the control unit 380 inside the housing 302 or on the housing 302. The GPS reception section 362 may be one example of the positioning signal obtaining section. The magnetic field detection section 366 may be one example of the detection section. The inclination detection section 368 may be one example of the detection section. The control unit 380 may be one example of the location estimation apparatus.

The magnetic field detection section 366 and the inclination detection section 368 may have a configuration similar to that of the detection section 160 as long as there is no technical contradiction. Likewise, the detection section 160 may have a configuration similar to that of at least one of the magnetic field detection section 366 and the inclination detection section 368 as long as there is no technical contradiction.

The control unit 380 may have a configuration similar to that of the location estimation apparatus 170 as long as there is no technical contradiction. Likewise, the location estimation apparatus 170 may have a configuration similar to the control unit 380 as long as there is no technical contradiction.

In the present embodiment, the battery unit 340 supplies electrical power to each section of the lawn mower 210. In the present embodiment, the user interface 350 accepts a user input. The user interface 350 outputs information to a user. Examples of the user interface 350 may include a keyboard, a pointing device, a microphone, a touch panel, a display, a speaker and the like.

In the present embodiment, the GPS reception section 362 receives a GPS signal from a positioning satellite. In one embodiment, upon receiving a GPS signal, the GPS reception section 362 outputs the signal to the control unit 380. The GPS reception section 362 may associate the GPS signal and the information indicating the time when the signal is received and output the same to the control unit 380.

The GPS signal may be one example of the positioning signal. The GPS signal is a radio wave signal for the global positioning system (GPS) and include the information used for positioning the location where the signal is received. The GPS signal may include the precision information indicating the positioning precision. Another example of the positioning signal may include radio wave signal for satellite positioning system (also referred to as satellite navigating system in some cases), radio wave signal for the global navigation satellite system (GNSS), radio wave signal for quasi-zenith satellite system, and the like.

In another embodiment, the GPS reception section 362 may associate the information indicating the location indicated by the GPS signal and the information indicating the time when the signal is received and output the same to the control unit 380. The GPS reception section 362 may associate the information indicating the location indicated by the GPS signal, the information indicating the error range indicated by the GPS signal or the information indicating the positioning precision included in the GPS signal, and the information indicating the time when the signal is received ad output the same to the control unit 380.

In the present embodiment, the image-capturing unit 364 captures the image around the lawn mower 210. The image-capturing unit 364 may captures at least a part of the target region 104. The image-capturing unit 364 may transmit the data of the captured image to the management server 230. The image may be a video image or may be a static image. The image may be a wide angle image, or may be a 180 degree panoramic image or may be a 360 degree panoramic image. The image may be an image captured by a visible light camera, or an image captured by an infrared camera.

The image-capturing unit 364 may transmit the information indicating at least one of an image-capturing time, an image-capturing direction, and an image-capturing condition to the management server 230. Examples of the image-capturing condition may include a zoom magnification, an aperture, whether an optical filter exists or whether an optical filter is needed, a type of an optical filter, a resolution, a shatter speed, a frame rate, a capturing altitude, an angle of view, a focal length, render settings, and the like. The image-capturing unit 364 may perform various types of processing based on the control signal from the control unit 380. Examples of the above-described process may include starting an image-capturing, stopping an image-capturing, adjusting or changing an image-capturing direction, adjusting or changing an image-capturing condition, saving an image data, transmitting an image data, and the like.

In the present embodiment, the magnetic field detection section 366 detects the magnetic field [A/m]. The magnetic field detection section 366 may detect the orientation of the magnetic field. The magnetic field detection section 366 outputs the information indicating the magnitude of the detected magnetic field to the control unit 380. The magnetic field detection section 366 may associate the information indicating the magnitude of the detected magnetic field and the information indicating the time when the magnetic field is detected and output the same to the control unit 380. Adding to these pieces of information, or associating with these pieces of information, the magnetic field detection section 366 may output the information indicating the orientation of the detected magnetic field to the control unit 380. The output data from the magnetic field detection section 366 may be one example of the first intensity information.

In one embodiment, the magnetic field detection section 366 may include a magnetic sensor to detect magnetic field. In another embodiment, the magnetic field detection section 366 may detect the magnitude of the magnetic field and the like based on the output from the magnetic sensor disposed in the sensor unit 370.

In the present embodiment, the inclination detection section 368 detects the inclination H of the lawn mower 210 relative to the horizontal direction or the vertical direction. The inclination detection section 368 detects the inclination H of the lawn mower 210 relative to at least the horizontal direction or vertical direction based on, for example, the output from at least one of the acceleration sensor and the gyro sensor mounted to the lawn mower 210. The inclination detection section 368 may detect the three-dimensional inclination of the lawn mower 210. The above-described acceleration sensor may be a three-axis acceleration sensor. The above-described gyro sensor may be a three-axis gyro sensor.

The inclination detection section 368 outputs the information indicating the magnitude of the detected inclination to the control unit 380. The magnetic field detection section 366 may associate the information indicating the magnitude of the detected inclination and the information indicating the time when the inclination is detected and output the same to the control unit 380. The output data from the inclination detection section 368 may be one example of the second intensity information.

In one embodiment, the inclination detection section 368 may include at least one of the acceleration sensor and the gyro sensor. In another embodiment, the inclination detection section 368 may detect the inclination of the lawn mower 210 based on the output from at least one of the acceleration sensor and the gyro sensor disposed in the sensor unit 370.

In the present embodiment, the sensor unit 370 includes various types of sensors. The sensor unit 370 may include various types of internal sensors. The sensor unit 370 may include various types of external sensors. The sensor unit 370 may transmit the output from various types of sensors to the control unit 380. Examples of sensors may include a millimeter wave sensor, a proximity detection sensor, a contact detection sensor, an acceleration sensor, a gyro sensor, a wheel speed sensor, a rotary encoder, a load sensor, an idling detection sensor, a magnetic sensor, a geomagnetic sensor (also referred to as orientation sensor, electronic compass, and the like in some cases), a soil moisture sensor, and the like.

In the present embodiment, the control unit 380 controls the lawn mower 210. More specifically, the control unit 380 controls the operation of the lawn mower 210. Examples of the operation of the lawn mower 210 may include an operation related to a movement of the lawn mower 210, an operation related to a work of the lawn mower 210, and the like. According to one embodiment, the control unit 380 controls a pair of the travel motor 316 to control the movement of the lawn mower 210. According to another embodiment, the control unit 380 controls the work unit 320 to control a work of the lawn mower 210.

The control unit 380 may control the operation of the lawn mower 210 based on the output from at least one of the magnetic field detection section 366 and the inclination detection section 368. The control unit 380 may control the operation of the lawn mower 210 based on (i) the output from at least one of the magnetic field detection section 366 and the inclination detection section 368 and (ii) the output from the GPS reception section 362. The control unit 380 will be described in detail later.

FIG. 4 schematically shows one example of an internal configuration of the control unit 380. In the present embodiment, the control unit 380 includes the communication control section 410, the travel control section 420, the work unit control section 430, the input/output control section 440, the location estimation section 450, and the storage section 460. Each section of the control unit 380 may transmit and receive the information with each other.

The location estimation section 450 may be one example of the location estimation apparatus. The location estimation section 450 may have a configuration similar to that of the location estimation apparatus 170 as long as there is no technical contradiction. Likewise, the location estimation apparatus 170 may have a configuration similar to that of the location estimation section 450 as long as there is no technical contradiction.

In the present embodiment, the communication control section 410 controls communication with the equipment located outside the lawn mower 210. The communication control section 410 may be a communication interface compatible with one or more communication schemes. Examples of the external equipment may include the user terminal 22, the management server 230, and the like.

In the present embodiment, the travel control section 420 controls the travel motor 316 to control movement of the lawn mower 210. The travel control section 420 controls the autonomous travel of the lawn mower 210. The travel control section 420 may utilize the information indicating the location of the lawn mower 210 output from the location estimation section 450 to control the autonomous travel of the lawn mower 210.

For example, the travel control section 420 may control at least one of an advancing speed, an advancing direction, a moving mode, and a travel route of the lawn mower 210. The travel control section 420 may perform at least one of a straight movement control, a rotation control, and a circling control of the lawn mower 210. The travel control section 420 may monitor the current value of the travel motor 316.

In the present embodiment, the work unit control section 430 controls the work unit 320. The work unit control section 430 may utilize the information indicating the location of the lawn mower 210 output from the location estimation section 450 to control the work unit 320.

The work unit control section 430 may control at least one of a work mode of the work unit 320, a type of work, an intensity of work, and the timing when the work is performed. For example, the work unit control section 430 controls the work motor 326 and controls work intensity of the work unit 320. The work unit control section 430 may control the location adjustment section 330 to control work intensity of the work unit 320. The work unit control section 430 may monitor the current value of the work motor 326.

In the present embodiment, the input/output control section 440 accepts the input from at least one of the user interface 350, the GPS reception section 362, the image-capturing unit 364, the magnetic field detection section 366, the inclination detection section 368, and the sensor unit 370. The input/output control section 440 may control at least one of the user interface 350, the GPS reception section 362, the image-capturing unit 364, the magnetic field detection section 366, the inclination detection section 368, and the sensor unit 370.

The input/output control section 440 outputs the information to the user interface 350. The input/output control section 440 may output information to at least one of the user terminal 22 and the management server 230 via the communication control section 410. For example, if the estimation precision of the self-location of the lawn mower 210 does not satisfy a predetermined criteria, or if any failure occurs in the lawn mower 210, the input/output control section 440 outputs the information indicating the state of the lawn mower 210 to at least one of the user terminal 22 and the management server 230.

In the present embodiment, the location estimation section 450 outputs the information indicating the location of the lawn mower 210. In one embodiment, the location estimation section 450 outputs the information indicating the location of the lawn mower 210 based on the output from at least one of the magnetic field detection section 366 and the inclination detection section 368. In another embodiment, the location estimation section 450 outputs the information indicating the location of the lawn mower 210 based on (i) the output from at least one of the magnetic field detection section 366 and the inclination detection section 368 and (ii) the output from the GPS reception section 362. The location estimation section 450 will be described in detail later.

In the present embodiment, the storage section 460 stores various types of information. The storage section 460 may store the information related to the target region 104. For example, the storage section 460 stores the information indicating the location or range of a plurality of subareas 106 included in the target region 104. Specifically, the storage section 460 associates and stores the identification information of each of a plurality of subareas 106 and the information indicating a location and range of each subarea.

The storage section 460 may store various types of map information. The map information related to a particular target quantity indicates, for example, the geographic distribution of the target quantity in the target region 104 and the vicinity thereof. The map information related to a particular target quantity may include the information indicating a magnitude of the target quantity in each of a plurality of subareas 106 included in the target region 104. The map information related to a particular target quantity may include the information indicating a measurement precision of the target quantity in each of a plurality of subareas 106 included in the target region 104.

The map information may be, for example, the information which associates the identification information of the subarea 106 and at least one of the information indicating the magnitude of the target quantity and the information indicating the measurement precision of the target quantity. The storage section 460 stores at least one of (i) the first map information related to the magnitude of the magnetic field and (ii) the second map information related to the magnitude of inclination of the lawn mower 210.

The first information map may be the information which associates the identification information of the subarea 206 and the first intensity parameter indicating the premeasured magnitude of magnetic field in the subarea 206 identified in the identification information. The first information map may be the information which associates the identification information of the subarea 206, the first intensity parameter indicating the premeasured magnitude of magnetic field in the subarea 206 identified by the identification information, and the first estimation precision information indicating the location estimation precision with the first intensity parameter.

The second information map may be the information which associates the identification information of the subarea 206, the second intensity parameter indicating the magnitude of inclination of the lawn mower 210 premeasured in the subarea 206 identified in the identification information. The second information map may be the information which associates the identification information of the subarea 206, the second intensity parameter indicating the magnitude of the inclination of the lawn mower 210 premeasured in the subarea 206 identified with the identification information, and the second estimation precision information indicating the location estimation precision with the second intensity parameter.

The storage section 460 may store the information related to the lawn mower 210. The storage section 460 may store the output data from at least one of the GPS reception section 362, the image-capturing unit 364, the magnetic field detection section 366, the inclination detection section 368, and the sensor unit 370. The storage section 460 may store the output data from the location estimation section 450. The storage section 460 may store the control history of the work unit control section 430 and the work unit control section 430. The storage section 460 may store the movement history of the work unit control section 430. The storage section 460 may store the work history of the lawn mower 210.

FIG. 5 schematically indicates one example of the internal configuration of the location estimation section 450. In the present embodiment, the location estimation section 450 includes the intensity information generation section 522, the distance information generation section 524, the intensity pattern generation section 526, and the estimation information generation section 528. In the present embodiment, the location estimation section 450 includes the GPS signal obtaining section 532 and the positioning information generation section 534. In the present embodiment, the location estimation section 450 includes the location information output section 542 and the advancing information output section 544.

The intensity information generation section 522 may be one example of the intensity information obtaining section. The distance information generation section 524 may be one example of the distance information obtaining section. The intensity pattern generation section 526 may be one example of the intensity pattern determination section. The estimation information generation section 528 may be one example of the subarea determination section. The GPS signal obtaining section 532 may be one example of the positioning signal obtaining section. The location information output section 542 may be one example of the output section.

The intensity information generation section 522 may have a configuration similar to that of the intensity information obtaining section 172 as long as there is no technical contradiction. Likewise, the intensity information obtaining section 172 may have a configuration similar to that of the intensity information generation section 522 as long as there is no technical contradiction.

The distance information generation section 524 may have a configuration similar to that of the distance information obtaining section 174 as long as there is no technical contradiction. Likewise, the distance information obtaining section 174 may have a configuration similar to that of the distance information generation section 524 as long as there is no technical contradiction.

The intensity pattern generation section 526 may have a configuration similar to that of the intensity pattern determination section 176 as long as there is no technical contradiction. Likewise, the intensity pattern determination section 176 may have a configuration similar to that of the intensity pattern generation section 526 as long as there is no technical contradiction.

The estimation information generation section 528 may have a configuration similar to that of the subarea determination section 178 as long as there is no technical contradiction. Likewise, the subarea determination section 178 may have a configuration similar to that of the estimation information generation section 528 as long as there is no technical contradiction.

The location information output section 542 may have a configuration similar to that of the output section 180 as long as there is no technical contradiction. Likewise, the output section 180 may have a configuration similar to that of the location information output section 542 as long as there is no technical contradiction.

In the present embodiment, the intensity information generation section 522 obtains at least one of the output data from the magnetic field detection section 366 and the output data from the inclination detection section 368. The intensity information generation section 522 may convert the output data from the magnetic field detection section 366 to the format which is comparable to the first intensity parameter included in the first map information as needed. The intensity information generation section 522 may convert the output data from the inclination detection section 368 to the format which is comparable to the second intensity parameter included in the second map information as needed. The intensity information generation section 522 outputs the above-described information to the intensity pattern generation section 526.

In the present embodiment, the distance information generation section 524 obtains the distance information indicating the distance between two spots where each of two pieces of intensity information obtained by the intensity information generation section 522 has been obtained. The distance information generation section 524 may calculate the above-described distance based on the output data from the wheel speed sensor or rotary encoder included in the sensor unit 370. The distance information generation section 524 may read a plurality of intensity information included in at least one of the output data from the magnetic field detection section 366 and the output data from the inclination detection section 368 and output the above-described distance for each of two pieces of intensity information which are in a consecutive order in time series. The distance information generation section 524 outputs the information related to the above-described distance to the intensity pattern generation section 526.

For example, the output data from the wheel speed sensor or rotary encoder includes (i) the information indicating time and (ii) the information which associates the location of the moving object 150 at the time and the information indicating the locational relationship relative to the location of the reference spot. Using the information indicating the time as the key, the distance information generation section 524 matches at least one of the output data from the magnetic field detection section 366 and the output data from the inclination detection section 368, and the output data from the wheel speed sensor or rotary encoder. Thereby, the distance information generation section 524 can calculate the above-described distance for each of two pieces of intensity information which are in a consecutive order in time series in the output data from the magnetic field detection section 366 or in the output data from the inclination detection section 368.

In the present embodiment, the intensity pattern generation section 526 determines the intensity pattern indicating the distribution of magnitude of the target quantity along at least a part of the moving path of the lawn mower 210. For example, the intensity pattern generation section 526 determines at least one of (i) the first intensity pattern indicating the distribution of the magnitude of magnetic field in at least a part of the moving path of the lawn mower 210 and (ii) the second intensity pattern indicating the distribution of magnitude of the inclination of the lawn mower 210 in at least part of the moving path of the lawn mower 210. The intensity pattern generation section 526 outputs the above-described intensity pattern to the estimation information generation section 528.

The intensity pattern generation section 526 may determine the intensity pattern with the procedure similar to that of the intensity pattern determination section 176. The data interval in the intensity pattern may be shorter than the representative length of the subarea 106. Thereby, the location estimation section 450 can precisely determine the advancing direction of the lawn mower 210.

The representative length of the subarea 106 may be the length of the diameter of a circle or a side of the square whose area is the same as the area of the subarea 106. If the shape of the subarea is rectangular, the representative length of the subarea 106 may be the length of the shorter side.

In the present embodiment, the estimation information generation section 528 determines one or more subareas 106 which are likely to have the lawn mower 210 therein based on the intensity pattern determined by the intensity pattern generation section 526 and the map information stored in the storage section 460. Thereby, the intensity pattern generation section 526 can estimate the location of the lawn mower 210. The estimation information generation section 528 may determine the estimation precision of the location of the lawn mower 210 based on the intensity pattern determined by the intensity pattern generation section 526 and the map information stored in the storage section 460.

In one embodiment, the estimation information generation section 528 detects, among the intensity pattern indicated by the map information, the pattern which matches or is similar to the intensity pattern determined by the intensity pattern generation section 526. The above-described pattern may be detected by utilizing a pattern recognition technique or a text recognition technique which is known or will be developed in the future. Thereby, the estimation information generation section 528 can determine, among a plurality of subareas 106 included in the target region 104, one or more subareas 106 having the intensity pattern which matches or is similar to the intensity pattern determined by the intensity pattern generation section 526.

In another embodiment, the estimation information generation section 528 first extracts, among a plurality of subareas 106 included in the target region 104, one or more subareas which are at least partly present inside the region defined by the location and error range indicated by the GPS signal obtained by the GPS signal obtaining section 532. Then, the estimation information generation section 528 determines, among one or more extracted subareas, one or more subareas 106 having the intensity pattern which matches or is similar to the intensity pattern determined by the intensity pattern generation section 526. Thereby, the calculation amount and calculation time can be reduced.

In yet another embodiment, the estimation information generation section 528 requests the intensity pattern generation section 526 to change the intensity pattern if it cannot determine one or more subareas 106 having the intensity pattern which matches or is similar to the intensity pattern determined by the intensity pattern generation section 526. The intensity pattern generation section 526 determines the intensity pattern by, for example, increasing the length of the moving path determined by the intensity pattern. The estimation information generation section 528 may determine one or more subareas 106 having the intensity pattern which matches or is similar to a new intensity pattern.

The estimation information generation section 528 may determine one or more subareas 106 having the intensity pattern which matches or is similar to the first intensity pattern based on the first map information and the first intensity pattern. The estimation information generation section 528 may determine one or more subareas 106 having the intensity pattern which matches or is similar to the second intensity pattern based on the second map information and the second intensity pattern.

The estimation information generation section 528 may determine one or more subareas 106 which are likely to have the lawn mower 210 therein based on the first map information, the second map information, the first intensity pattern, and the second intensity pattern. For example, the estimation information generation section 528 determines one or more subareas 106 having the intensity pattern which matches or is similar to the first intensity pattern based on the first map information and the first intensity pattern. The estimation information generation section 528 determines one or more subareas 106 having the intensity pattern which matches or is similar to the second intensity pattern based on the second map information and the second intensity pattern. The estimation information generation section 528 determines one or more subareas 106 common to the both as one or more subareas 106 which are likely to have the lawn mower 210.

The estimation information generation section 528 generates the estimation information indicating the estimated location of the lawn mower 210 and outputs the estimation information to the location information output section 542 and the advancing information output section 544. The estimation information may include the information indicating the estimated location of the lawn mower 210. The estimation information may include the information indicating the estimation precision of the location of the lawn mower 210.

In the present embodiment, the GPS signal obtaining section 532 obtains the GPS signal received by the GPS reception section 362. The GPS signal obtaining section 532 may obtain the information indicating the time when the GPS signal is received. The GPS signal obtaining section 532 outputs the above-described information to the GPS signal obtaining section 532.

The positioning information generation section 534 may analyze the GPS signal obtained by the GPS signal obtaining section 532 to position the location of the lawn mower 210 at the spot where the GPS signal has been received. The positioning information generation section 534 generates the estimation information indicating the positioned location of the lawn mower 210 and outputs the positioning information to the location information output section 542 and the advancing information output section 544. The positioning information may include the information indicating the positioned location of the lawn mower 210. The estimation information may include the information indicating the positioning precision of the location of the lawn mower 210.

In the present embodiment, the location information output section 542 may obtain the estimation information generated by the estimation information generation section 528 and the positioning information generated by the positioning information generation section 534. The location information output section 542 generates the location information indicating the location of the lawn mower 210 based on at least one of the estimation information and the positioning information.

In one embodiment, the location information output section 542 outputs one or more subareas determined by the estimation information generation section 528 as the location of the lawn mower 210 based on the estimation information. For example, if the estimation precision indicated by the estimation information is better than the positioning precision indicated by the positioning information, the location information output section 542 outputs one or more subareas determined by the estimation information generation section 528 as the location of the lawn mower 210.

In another embodiment, the location information output section 542 outputs the region defined by the location and error range indicated by the GPS signal as the location of the lawn mower 210 based on the positioning information. For example, if the positioning precision indicated by the positioning information is better than the estimation precision indicated by the estimation information, the location information output section 542 outputs the region defined by the location and error range indicated by the GPS signal as the location of the lawn mower 210.

In yet another embodiment, the location information output section 542 outputs, as the location of the lawn mower 210, a part of one or more subareas 106 determined by the estimation information generation section 528 based on the estimation information and the positioning information. For example, the location information output section 542 outputs, as the location of the lawn mower 210, the subarea 106 partly included in the region defined by the location and the error range indicated by the GPS signal among one or more subareas 106 determined by the estimation information generation section 528. The location information output section 542 outputs, as the location of the lawn mower 210, the subarea 106 entirely included in the region defined by the location and the error range indicated by the GPS signal among one or more subareas 106 determined by the estimation information generation section 528.

In the present embodiment, the advancing information output section 544 determines at least one of the advancing direction and the advancing speed of the lawn mower 210. The advancing information output section 544 outputs the information indicating at least one of the advancing direction and the advancing speed of the lawn mower 210.

FIG. 6 schematically shows one example of the internal configuration of the management server 230. In the present embodiment, the management server 230 includes the communication control section 610, the request process section 620, the map management section 630, the equipment management section 640, the growing condition management section 650, and the work plan management section 660.

In the present embodiment, the communication control section 610 controls communication with the equipment outside the management server 230. The communication control section 610 may be a communication interface compatible with one or more communication scheme. Examples of the external equipment may include the user terminal 22, the lawn mower 210, and the like. In the present embodiment, the request process section 620 accepts the request from the external equipment. The request process section 620 processes the request from the external equipment.

In the present embodiment, the map management section 630 manages the map information. For example, the map management section 630 performs the process such as generating, updating, deleting, and searching of the map information. In one embodiment, the map management section 630 manages the map information of all subareas included in the target region 104. In another embodiment, the map management section 630 manages, for a part of the subarea among the subareas included in the target region 104, the map information of the subarea.

For example, in response to a request from the lawn mower 210, the map management section 630 may extract the map information matching the request, and may transmit the extracted map information to the lawn mower 210. For example, in response to a request from the lawn mower 210, the map management section 630 transmits the map information around the current location of the lawn mower 210 to the lawn mower 210. The map management section 630 will be described in detail later.

In the present embodiment, the equipment management section 640 manages various types of equipment which configure the management system 200. For example, the equipment management section 640 controls the lawn mower 210. The equipment management section 640 may manage the information related to the various types of equipment related to the management system 200. For example, the equipment management section 640 obtains the information related to the state of the lawn mower 210 from the lawn mower 210. The equipment management section 640 may manage the information related to the user terminal 22.

In the present embodiment, the growing condition management section 650 manages the information related to the growing condition of the plant. The growing condition management section 650 may manage the information related to the growing condition of the plant in each of a plurality of subareas included in the target region 104. The growing condition management section 650 may manage the information related to the growing condition of the plant in at least one of a plurality of subareas included in the target region 104. Examples of the growing condition of the plant may include the growing stage of the plant, the growing status of the plant, and the like. Examples of the information indicating the growing status of the plant may include the color of the plant, the thickness of the plant, the density of the plant, and the like. It is expected that the load on the work unit 320 increases as the plant grows well. Therefore, the information indicating the growing status of the plant may be the information indicating the load of the work unit 320. Examples of the load of the work unit 320 may include the load of the work motor 326, the wearing condition of the cutter blade 324, and the like.

The growing condition management section 650 may manage the information related to the growing environment of the plant. Examples of the growing environment of the plant may include the information related to the soil of the subarea where the plant is arranged, and the like.

In the present embodiment, the work plan management section 660 manages the schedule of the work performed by the lawn mower 210 (also referred to as work schedule in some cases). For each of a plurality of subareas included in the target region 104, the work plan management section 660 may plan the schedule of the work to be performed in the subarea. The work plan management section 660 may plan the work schedule of the lawn mower 210. The work plan management section 660 may manage the progress of the work schedule of the lawn mower 210.

The work schedule may be the information which associates (i) the identification information indicating each of a plurality of subareas, (ii) a timing when the work related to the growing of the plant in the subarea is performed, and (iii) at least one of the type and the intensity of the work in the subarea. Examples of the work type include (i) civil engineering work, (ii) construction work, (iii) cultivation work for plant or agricultural product, (iv) snow clearing work, (v) cleaning work, (vi) carrying work, (vii) monitoring, security, or guarding work, and the like. Examples of a cultivation work include sowing, pruning, lawn mowing, grass cutting, watering, fertilizing, soiling, weeding, and the like.

The work plan management section 660 may obtain, from the lawn mower 210, the information indicating the progress status of the work in each spot or region through which the lawn mower 210 passed. Examples of the information indicating the progress status of the work may include the information indicating the load of the work unit 320, the information indicating the analysis result of the image captured by the image-capturing unit 364, the information indicating the analysis result of the output from the sensor unit 370, and the like. The work plan management section 660 may update the work schedule based on the information obtained by the growing condition management section 650.

FIG. 7 schematically shows one example of the internal configuration of the map management section 630. In the present embodiment, the map management section 630 includes the measurement result obtaining section 722, the intensity parameter determination section 724, the precision parameter determination section 726, and the map information generation section 728.

In the present embodiment, for each of a plurality of subareas 106 included in the target region 104, the measurement result obtaining section 722 obtains the information indicating the magnitude of the target quantity measured inside the subarea. The measurement result obtaining section 722 may obtain, for each of a plurality of subareas 106 included in the target region 104, the information indicating the measurement precision of the target quantity measured inside the subarea.

In the present embodiment, the intensity parameter determination section 724 determines the intensity parameter of each subarea based on the information indicating the magnitude of the target quantity obtained by the measurement result obtaining section 722. In the present embodiment, the precision parameter determination section 726 determines the precision parameter of each subarea based on the information indicating the measurement precision of the target quantity obtained by the measurement result obtaining section 722.

In the present embodiment, the map information generation section 728 generates various types of map information. The map information generation section 728 may generate the map information by associating the intensity parameter of each subarea determined by the intensity parameter determination section 724 and the area identification information of each subarea. The map information generation section 728 may generate the map information by associating the precision parameter of each subarea determined by the intensity parameter determination section 724 and the area identification information of each subarea. The map information generation section 728 may generate the map information by associating the intensity parameter and the precision parameter of each subarea determined by the intensity parameter determination section 724 and the area identification information of each subarea.

While the embodiments of the present invention have been described, the technical scope of the invention is not limited to the above described embodiments. It is apparent to persons skilled in the art that various alterations or improvements can be added to the above-described embodiments. Also, matters explained with reference to a particular embodiment can be applied to other embodiments as long as there is no technical contradiction. For example, what is described for an embodiment of FIG. 1 can be applied to another embodiment described with reference to another figure. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order. EXPLANATION OF REFERENCES map information, 20 communication network, 22 user terminal, 104 target region, 106 subarea, 150 moving object, 160 detection section, 170 location estimation apparatus, 172 intensity information obtaining section, 174 distance information obtaining section, 176 intensity pattern determination section, 178 subarea determination section, 180 output section, 200 management system, 206 subarea, 208 area wire, 210 lawn mower, 230 management server, 302 housing, 312 front wheel, 314 rear wheel, 316 travel motor, 320 work unit, 322 blade disk, 324 cutter blade, 326 work motor, 328 shaft, 330 location adjustment section, 340 battery unit, 350 user interface, 362 GPS reception section, 364 image-capturing unit, 366 magnetic field detection section, 368 inclination detection section, 370 sensor unit, 380 control unit, 410 communication control section, 420 travel control section, 430 work unit control section, 440 input/output control section, 450 location estimation section, 460 storage section, 522 intensity information generation section, 524 distance information generation section, 526 intensity pattern generation section, 528 estimation information generation section, 532 GPS signal obtaining section, 534 positioning information generation section, 542 location information output section, 544 advancing information output section, 610 communication control section, 620 request process section, 630 map management section, 640 equipment management section, 650 growing condition management section, 660 work plan management section, 722 measurement result obtaining section, 724 intensity parameter determination section, 726 precision parameter determination section, 728 map information generation section

What is claimed is:

1. A location estimation apparatus, comprising:
   an intensity information obtaining section to obtain intensity information indicating a magnitude of a target quantity detected by a detection section mounted to a moving object;
   a distance information obtaining section to obtain a distance information indicating a distance between two spots where each of two pieces of intensity information obtained by the intensity information obtaining section has been obtained;
   an intensity pattern determination section to determine, based on (i) a plurality of pieces of intensity information obtained by the intensity information obtaining section along at least a part of a moving path of the moving object and (ii) distance information corresponding to the plurality of intensity information obtained by the distance information obtaining section, an intensity pattern indicating a distribution of a magnitude of the target quantity along the at least a part of the moving path of the moving object;
   a subarea determination section to determine, among the plurality of subareas, one or more subareas having an intensity pattern which matches or is similar to the intensity pattern determined by the intensity pattern determination section based on map information which associates area identification information which identifies each of a plurality of subareas included in a target region having a predetermined geographic range and an intensity parameter indicating a magnitude of the target quantity premeasured in the subarea; and
   an output section to output, as a location of the moving object, at least a part of the one or more subareas determined by the subarea determination section.

2. The location estimation apparatus according to claim 1, wherein
   in the map information, area identification information of each subarea is associated to a precision parameter indicating an estimation precision of a location in each subarea,
   the location estimation apparatus further includes:
   a positioning signal obtaining section to obtain a positioning signal including a precision information indicating a positioning precision from a positioning signal reception section mounted to a moving object, and
   if a precision indicated by a precision parameter associated to the one or more subareas extracted by the subarea determination section is lower than a precision indicated by the precision information included in the positioning signal obtained by the positioning signal obtaining section, the output section outputs, as a location of the moving object, a region defined by a location and error range indicated by the positioning signal obtained by the positioning signal obtaining section.

3. The location estimation apparatus according to claim 2, wherein
   the subarea determination section determines, among one or more subareas which are at least partly present inside a region defined by a location and error range indicated by the positioning signal obtained by the positioning signal obtaining section, one or more subareas having an intensity pattern which matches or is similar to the intensity pattern determined by the intensity pattern determination section.

4. The location estimation apparatus according to claim 1, wherein the intensity information indicates a magnitude of magnetic field [A/m].

5. The location estimation apparatus according to claim 1, wherein the intensity information indicates a magnitude of inclination H of the moving object relative to a horizontal direction or a vertical direction.

6. The location estimation apparatus according to claim 1, wherein
   the intensity information obtaining section obtains (i) first intensity information indicating a magnitude of magnetic field [A/m] and (ii) second intensity information indicating a magnitude of an inclination [°] of the moving object relative to at least one of a horizontal direction or a vertical direction,
   the intensity pattern determination section determines (i) a first intensity pattern indicating a distribution of a magnitude of the magnetic field in the at least a part of the moving path of the moving object and (ii) a second intensity pattern indicating a distribution of a magnitude of an inclination of the moving object in the at least a part of the moving path of the moving object, and
   the subarea determination section determines the one or more subareas based on (i) a first map information related to a magnitude of magnetic field in each of the plurality of subareas included in the target region, (ii) second map information related to a magnitude of an inclination of the moving object in each of the plurality of subareas included in the target region, and (iii) the first intensity pattern and the second intensity pattern determined by the intensity pattern determination section.

7. The location estimation apparatus according to claim 1, comprising:
- a measurement result obtaining section to obtain, for each of the plurality of subareas, information indicating a magnitude of the target quantity measured inside an area of the subarea;
- an intensity parameter determination section to determine the intensity parameter of each subarea based on information indicating a magnitude of the target quantity obtained by the measurement result obtaining section; and
- a map information generation section to generate the map information by associating the intensity parameter of each subarea determined by the intensity parameter determination section and the area identification information of each subarea.

8. A non-transitory computer-readable storage medium to store a program, wherein
the program enables a computer to perform:
- an intensity information obtaining step to obtain intensity information indicating a magnitude of a target quantity detected by a detection section mounted to a moving object;
- a distance information obtaining step to obtain distance information indicating a distance between two spots where each of two pieces of intensity information obtained in the intensity information obtaining step has been obtained;
- an intensity pattern determination step to determine, based on (i) a plurality of pieces of intensity information obtained along at least a part of a moving path of the moving object in the intensity information obtaining step and (ii) a distance information corresponding to the plurality of intensity information obtained in the distance information obtaining step, an intensity pattern indicating a distribution of a magnitude of the target quantity in the at least a part of the moving path of the moving object;
- a subarea determination step to determine, based on map information which associates area identification information which identifies each of a plurality of subareas included in a target region having a predetermined geographic range and an intensity parameter indicating a magnitude of the target quantity premeasured in the subarea, one or more subareas having an intensity pattern which matches or is similar to the intensity pattern determined in the intensity pattern determination step among the plurality of subareas; and
- an output step to output, as a location of the moving object, the one or more subareas determined in the subarea determination step.

9. A moving object, comprising:
a location estimation apparatus according to claim 1; and
the detection section.

10. A moving object, comprising:
a location estimation apparatus according to claim 2; and
the detection section.

11. A location estimation method, comprising:
- an intensity information obtaining step to obtain intensity information indicating a magnitude of a target quantity detected by a detection section mounted to a moving object;
- a distance information obtaining step to obtain distance information indicating a distance between two spots where each of two pieces of intensity information obtained in the intensity information obtaining step has been obtained;
- an intensity pattern determination step to determine, based on (i) a plurality of pieces of intensity information obtained along at least a part of a moving path of the moving object in the intensity information obtaining step and (ii) a distance information corresponding to the plurality of intensity information obtained in the distance information obtaining step, an intensity pattern indicating a distribution of a magnitude of the target quantity in the at least a part of the moving path of the moving object;
- a subarea determination step to determine, based on map information which associates area identification information which identifies each of a plurality of subareas included in a target region having a predetermined geographic range and an intensity parameter indicating a magnitude of the target quantity premeasured in the subarea, one or more subareas having an intensity pattern which matches or is similar to the intensity pattern determined in the intensity pattern determination step among the plurality of subareas; and
- an output step to output, as a location of the moving object, the one or more subareas determined in the subarea determination step.

* * * * *